(12) United States Patent
Schwertfeger et al.

(10) Patent No.: US 7,297,718 B2
(45) Date of Patent: Nov. 20, 2007

(54) METHOD OF PRODUCING SUBSTANTIALLY SPHERICAL LYOGELS IN WATER INSOLUBLE SILYLATING AGENTS

(75) Inventors: Fritz Schwertfeger, Frankfurt am Main (DE); Uwe Baumler, Frankfurt am Main (DE)

(73) Assignee: Cabot Corporation, Boston, MA (US)

( * ) Notice: Subject to any disclaimer, the term of this patent is extended or adjusted under 35 U.S.C. 154(b) by 301 days.

(21) Appl. No.: 10/428,271

(22) Filed: May 2, 2003

(65) Prior Publication Data

US 2003/0207950 A1 Nov. 6, 2003

Related U.S. Application Data

(63) Continuation of application No. 09/607,099, filed on Jun. 29, 2000, now abandoned, which is a continuation of application No. PCT/EP99/00334, filed on Jan. 12, 1999, now abandoned.

(30) Foreign Application Priority Data

Jan. 14, 1998 (DE) .................. 198 01 004

(51) Int. Cl.
C08J 3/09 (2006.01)
B01J 13/00 (2006.01)
C01B 33/155 (2006.01)
C03C 3/00 (2006.01)

(52) U.S. Cl. ............... 516/100; 427/220; 423/338; 521/57; 428/405

(58) Field of Classification Search ............ 516/100; 427/220; 423/338; 521/57; 428/405
See application file for complete search history.

(56) References Cited

U.S. PATENT DOCUMENTS

| | | | |
|---|---|---|---|
| 2,093,454 A | 9/1937 | Kistler | 423/252 |
| 2,492,808 A * | 12/1949 | Griest et al. | 502/9 |
| 2,541,137 A | 2/1951 | Warrick | 524/588 |
| 2,680,696 A | 6/1954 | Broge | 516/77 |
| 2,786,042 A | 3/1957 | Iler | 516/79 |
| 2,886,460 A | 5/1959 | Alexander et al. | 516/23 |
| 2,978,298 A | 4/1961 | Wetzel | 516/111 |
| 3,015,645 A | 1/1962 | Tyler | 528/12 |
| 3,024,126 A | 3/1962 | Brown | 106/490 |
| 3,122,520 A | 2/1964 | Lentz | 106/490 |
| 3,615,142 A | 10/1971 | Dahlborn | 425/7 |
| 3,794,713 A | 2/1974 | Aboutboul | 423/338 |
| 3,872,217 A | 3/1975 | Merz | 423/338 |
| 4,101,442 A | 7/1978 | Rosen | 516/118 |
| 4,101,443 A | 7/1978 | Rosen et al. | 516/120 |
| 4,190,457 A | 2/1980 | McDaniel | 502/405 |
| 4,344,800 A | 8/1982 | Lutz | 106/481 |
| 4,382,070 A * | 5/1983 | Novak et al. | 423/338 |
| 4,704,374 A | 11/1987 | Jacques | 502/8 |
| 4,873,218 A | 10/1989 | Pekala | 502/418 |
| 4,888,369 A | 12/1989 | Moore | 524/100 |
| 4,906,676 A | 3/1990 | Ida | 523/212 |
| 4,950,502 A | 8/1990 | Saam | 427/213.36 |
| 5,001,183 A | 3/1991 | Sands | 524/493 |
| 5,009,874 A | 4/1991 | Parmentier et al. | 423/335 |
| 5,069,815 A | 12/1991 | Aoki et al. | 252/301.36 |
| 5,081,163 A | 1/1992 | Pekala | 521/187 |
| 5,215,733 A | 6/1993 | Potter | 423/338 |
| 5,256,386 A | 10/1993 | Nystrom et al. | |
| 5,275,796 A | 1/1994 | Tillotson | 423/338 |
| 5,409,683 A | 4/1995 | Tillotson | 423/338 |
| 5,484,818 A | 1/1996 | De Vos | 521/123 |
| 5,496,527 A | 3/1996 | Yokogawa | 423/338 |
| 5,508,341 A | 4/1996 | Mayer | 524/596 |
| 5,556,892 A | 9/1996 | Pekala | 521/181 |
| 5,561,318 A | 10/1996 | Gnade | 257/638 |
| 5,565,142 A | 10/1996 | Deshpande | 252/62 |
| 5,595,593 A | 1/1997 | Burns | 106/499 |
| 5,625,013 A | 4/1997 | Mueller | 526/106 |
| 5,651,921 A | 7/1997 | Kaijou | 516/34 |
| 5,674,962 A | 10/1997 | Ito et al. | 526/323.1 |
| 5,705,535 A | 1/1998 | Jansen | 521/64 |
| 5,708,069 A | 1/1998 | Burns | 524/403 |
| 5,750,610 A | 5/1998 | Burns | 524/434 |
| 5,795,556 A * | 8/1998 | Jansen et al. | 423/338 |
| 5,866,027 A | 2/1999 | Frank | 252/62 |
| 5,888,425 A | 3/1999 | Schwertfeger | 427/220 |
| 6,156,386 A | 12/2000 | Schwertfeger | |

FOREIGN PATENT DOCUMENTS

| | | |
|---|---|---|
| DE | 296 898 | 12/1915 |
| DE | 1 667 078 | 5/1971 |
| DE | 2 103 243 | 8/1972 |
| DE | 1667568 | 6/1974 |
| DE | 3 025 437 | 4/1980 |
| DE | 3 329 016 | 2/1985 |
| DE | 261 581 | 11/1988 |
| DE | 43 42 548 | 12/1993 |
| DE | 44 04 701 | 2/1994 |
| DE | 44 37 424 | 10/1994 |
| DE | 43 16 540 | 11/1994 |
| DE | 195 06 141 | 2/1995 |

(Continued)

OTHER PUBLICATIONS

Derwent Abstract on East, week 200394, London: Derwent Publications Ltd., AN 1974-47309V, Class E36, DE 1667568 B, (KALI-CHEMIE AG), abstract.*

(Continued)

Primary Examiner—Daniel S. Metzmaier

(57) ABSTRACT

A method of producing substantially spherical lyogels in water insoluble silylating agents is provided. The present invention refers to a method of producing substantially spherical lyogels in which a) a lyosol is provided, b) the lyosol obtained in step a) is transferred to at least one silylating agent in which the lyosol is insoluble, and c) the spherical lyosol formed in step b) is gelatinised in at least one silylating agent in which the lyosol is likewise insoluble, to produce the lyogel.

19 Claims, No Drawings

FOREIGN PATENT DOCUMENTS

| | | | |
|---|---|---|---|
| DE | 195 34 198 | | 9/1995 |
| DE | 195 41 715 | | 9/1995 |
| DE | 195 41 992 | | 10/1995 |
| DE | 195 37 821 | | 11/1995 |
| DE | 44 30 669 | | 3/1996 |
| DE | 195 02 453 | | 9/1996 |
| DE | 19624066 | | 12/1997 |
| EP | 0 031 166 | | 7/1981 |
| EP | 0 199 930 | | 11/1986 |
| EP | 298062 | | 1/1989 |
| EP | 0 552 484 | | 7/1993 |
| EP | 0 589 350 | | 7/1993 |
| EP | 658513 | * | 6/1995 |
| GB | 607 234 | | 8/1948 |
| GB | 682 574 | | 3/1951 |
| GB | 783868 | | 10/1955 |
| SE | CH 528 298 | | 1/1969 |
| WO | WO92/20623 | | 11/1992 |
| WO | WO94/22943 | | 10/1994 |
| WO | WO95/03358 | | 2/1995 |
| WO | WO96/06809 | | 3/1996 |
| WO | WO96/14266 | | 5/1996 |
| WO | WO96/15997 | | 5/1996 |
| WO | WO96/19607 | | 6/1996 |
| WO | WO 96/22942 A | * | 8/1996 |
| WO | WO96/25850 | | 8/1996 |
| WO | WO96/25950 | | 8/1996 |
| WO | WO97/10187 | | 3/1997 |
| WO | WO97/10188 | | 3/1997 |
| WO | WO97/17287 | | 5/1997 |
| WO | WO97/17288 | | 5/1997 |
| WO | WO97/18161 | | 5/1997 |
| WO | WO98/05591 | | 2/1998 |
| WO | WO99/64504 | | 12/1999 |

OTHER PUBLICATIONS

International Search Report—PCT/EP 98/02519, Sep. 10, 1998.
International Search Report—PCT/EP 97/06595, May 12, 1998.
International Search Report—PCT/EP 98/02283, Dec. 30, 1998.
EPO Search Report TS 68015, Feb. 24, 1998.
Gesser, H.D., *Chem.Rev.* 1989,89,765, month unknown.
Kistler, S.S., *Nature*, 127, 741 (May 1931).
Urbaniak, W., *React.Kinet.Catal.Lett.* 1987, 34, 129, month unknown.
International Search Report for PCT/EP 99/00334 , (Jul. 1999).

* cited by examiner

METHOD OF PRODUCING SUBSTANTIALLY SPHERICAL LYOGELS IN WATER INSOLUBLE SILYLATING AGENTS

This application is a continuation of U.S. application Ser. No. 09/607,099 filed on 29 Jun. 2000, now abandoned, which is a continuation of PCT/EP99/00334 filed on 12 Jan. 1999, now abandoned, which claims priority to German Patent Application No. 19801004.4 filed on 14 Jan. 1998.

The object of the present invention is a method of producing substantially spherical lyogels in water insoluble silylating agents and which can serve as a preliminary stage for aerogels.

Aerogels, particularly those which have a porosity of more than 60% and densities of less than 0.6 g/cu.cm have an extremely low thermal conductivity and are therefore used as a heat insulating material, as described for example in EP-A-0 171 722.

Aerogels in the wider sense, i.e. in the sense of "gel with air as the dispersing agent", are produced by drying a suitable gel. The term "aerogel" in this sense includes aerogels in the narrower sense, xerogels and cryogels. In this respect, a dried gel is described as an aerogel in the narrower sense when the fluid in the gel is removed at temperatures above the critical temperature and with effect from pressures above the critical pressure. On the other hand, if the fluid of the gel is removed sub-critically, for example with the formation of a fluid-vapour interphase, then the gel produced is often referred to also as a xerogel.

Where the use of the term aerogels in the present Application is concernred, these are aerogels in the wider sense, i.e. in the sense of "gel with air as a dispersing agent".

Furthermore, aerogels can, according to the type of gel structure, be basically be sub-divided into inorganic and organic aerogels.

Inorganic aerogels have been known since as long ago as 1931 (S. S. Kistler, Nature 1931, 127,741). These first aerogels were produced from water glass and an acid as the stating materials. In this case, the water in the resulting wet gels was exchanged for an organic solvent and this lyogel was then super-critically dried. In this way, hydrophilic aerogels were obtained (U.S. Pat. No. 2,093,454).

To date, a whole series of the most widely diverse inorganic aerogels have been produced. For example, $SiO_2$—, $Al_2O_3$—, $TiO_2$—, $ZrO_2$—, $SnO_2$—, $LiO_2$—, $CeO_2$— and $V_2O_5$-aerogels as well as mixtures of these have been produced (H. D. Gesser, P. C. Goswami, Chem. Rev. 1989, 89, 765 et seq.).

For some years, also organic aerogels have been known. In the literature, we find for example organic aerogels based on resorcin/formaldehyde, melamine/formaldehyde or resorcin/furfural (R. W. Pekala, J. Mater. Sci. 1989, 24, 3221, U.S. Pat. No. 5,508,341, RD 388047, WO 94/22943 and U.S. Pat. No. 5,556,892). Furthermore, organic aerogels produced from polyisocyanate are also known (WO 95/03358) and from polyurethanes (U.S. Pat. No. 5,484,818). As described for example in U.S. Pat. No. 5,508,341, the starting materials are such as formaldehyde and melamine dissolved in water, which are brought together and caused to react by suitable catalysts, the water in the pores of the gel formed is exchanged for a suitable organic solvent and super-critical drying follows.

Inorganic aerogels can be produced in various ways.

On the one hand, $SiO_2$ aerogels can be produced for example by acid hydrolysis and condensation of tetraethyl orthosilicate in ethanol. The result is a gel which can be dried by super-critical drying to retain the structure. Production methods based on this drying technique are known for instance from EP-A-0 396 076, WO 92/03378 and WO 95/06617.

An alternative to the above drying is afforded by a method for the sub-critical drying of $SiO_2$ gels, in which these latter, prior to drying, are reacted with a chlorine-containing silylating agent. The production method based on this drying technique is described in detail in WO 94/25149.

In addition to the tetra-alkoxy silanes used as starting materials in the above-described methods, it is however also possible to use water glasses as competitively priced starting materials for the production of $SiO_2$ aerogels.

If water glass is used as the starting material, then the lyogel will always be formed in a predominantly aqueous phase.

To this end, it is possible to produce for instance from an aqueous water glass solution and by means of an ion exchanger resin a silicic acid which can be polycondensed by the addition of a base to produce an $SiO_2$ gel. After exchange of the aqueous medium for a suitable organic solvent, this can then be dried super-critically or sub-critically. For sub-critical drying, in a further stage, the gel obtained is reacted for example with a chlorine-containing silylating agent. By virtue of their reactivity, preferably methyl chlorosilanes ($Me_{4-n}SiCl_n$ in which n=1 to 3) are used as silylating agents. The resulting $SiO_2$ gel modified on the surface with methyl silyl groups can then be air-dried out of an organic solvent. The production method based on this technique is disclosed for instance in EP-A-0 658 513.

Further special methods of producing aerogels on a basis of aqueous lyogels are described in WO 05/06617, DE-A-195 41 279, WO 96/22942, DE-A-195 25 021 as well as the not-published German Patent Applications 196 31 267, 196 48 797 and 196 48 798.

In the case of wet gels, xerogels and also aerogels, shaping plays a decisive role according to the subsequent use. For instance, if a specially defined macroscopic form is to be given to the aerogels for example, then this must take place during the course of aerogel production and in fact prior to, during and/or immediately after formation of the hydrogel or lyolgel. As aerogel production proceeds, the macroscopic forms present as hydrogel, lyogel or aerogel can only be comminuted by methods such as for example grinding, which are known to a man skilled in the art. However, generally the result is that there are no clearly defined shapes. Another set of problems occurs in the case of all products on a hydrogel or lyogel base and which are to have a clearly defined macroscopic form.

In the case of sub-critically dried aerogels, shaping acquires a further special role. During the course of sub-critical drying of organically modified lyogels, there is a considerable shrinkage of up to 90% by volume. Shortly prior to the end of drying, the shrunken lyogels then spring back to a volume approaching their initial volume, according to the gel type and surface modification. This is known to a man skilled in the art as "spring back". Where such a process is concernred, so that the network of the gel particles is retained and there is no extensive cracking or breakage, the gel particles must as far as possible be ideally radially symmetrical. Once again, this must take place in the shaping stage prior to, during and/or immediately after formation of the hydrogel or lyogel.

In this Application, lyogels is understood to mean any gels in the gel pores of which there is at least one solvent. Within the meaning of this Application, hydrogels have more than 50% by volume of water in relation to the solvent phase in the pores.

In principle, in order to produce a lyogel, a lyosol must be brought to gelatinisation in order to build up the lyogel network. The reaction times entailed thereby vary between a few seconds and a few hours. Since the shaping stage must take place in this time in order to guarantee the above-described clearly defined macroscopic form, it must be attuned to the respective gelatinisation time. Since the properties of the lyogel are vitally dependent upon the gelatinisation time, the shaping process is very important to the subsequent properties. The literature describes methods of shaping lyogels. In this respect, a distinction is made between methods in which the lyosol is brought either into a vapour and/or gas atmosphere or into a water soluble fluid.

Described in DE-C-21 03 243 is a method in which, by means of a special mixing nozzle, a hydrosol is formed from a acid solution and a raw material containing silicic acid and, for drop forming, it is sprayed into a gaseous medium, e.g. air.

However, the drawback with such a method is that where relatively large particles are being produced, the dropping distance has to be of a corresponding length, depending upon the gelatinisation time. Consequently, even with extremely short gelatinisation times, of only a few seconds, this method is limited to very small particles. In addition there is a non-homogeneous distribution of the lyogel particles.

Disclosed in the not-published German Patent Applications 197 22 737 and 197 22 738 is a method in which the lyosol is sprayed into a vapour atmosphere. In this respect, similar disadvantages to those described above are the result.

Somewhat larger and more uniform particles can be achieved by using water insoluble fluids as the shaping medium.

It is known for example from DE-C-896189 that spherical hydrogels can be produced in that a gel-forming silicic acid hydrosol can be produced from a raw material containing silicic acid, by reaction with an acid, and that this can then be passed in the form of individual drops through a fluid medium, e.g. a mineral oil, which is not miscible with water and the hydrosol. The hydrosol drops thereby acquire a more or less spherical form and remain in the oil layer until such time as the conversion from the Sol to the solid hydrogel has taken place.

The hydrogel balls produced by this method do however comprise mineral oil impurities which cannot be completely eliminated even by expensive washing.

Described in DD-C-253242 and DD-C-253243 is a method in which the residues on the gel particles are eliminated by an appropriately expensive process. In DD-C-253242, the hydrosol is sprayed into an oil column in which water forms an under layer. The gel particles formed in the oil column are freed from any attached oil residues in a CCl4 phase and/or water phase. Certainly, then, these cleaning phases must be recycled again by distillation.

In DD-C-253243, the gel particles are formed in a $CCl_4$ phase with an upper layer of water. The hydrosol is introduced into the $CCl_4$ phase from below and the gel particles which form are cleansed from attached $CCl_4$ residues upon transfer into the water phase. However, since by reason of their chemical composition the gel particles have a higher density than water, they are disposed directly on the phase limit which makes simple separation difficult. On the other hand, in this case also the water phase must be expensively cleaned.

Therefore, the object of the present invention was to provide a method of producing substantially spherical lyogels in which no residues of the shaping medium have to be removed from the gel particles before they are subjected to silylation and/or subsequent drying.

Surprisingly, this problem is resolved by a method of producing substantially spherical lyogels in which
a) a lyosol is provided,
b) the lyosol obtained in step a) is transferred to at least one silylating agent in which the lyosol is insoluble or is not noticeably soluble, and
c) the spherical lyosol formed in step b) is gelated in at least one silylating agent in which the lyosol is likewise insoluble or not noticeably soluble.

Preferably, both in step b) and also in step c), only one silylating agent is used It is particularly preferred to carry out the shaping in step b) and the gelation in one stage and therefore also in only one silylating agent.

In the present Application, the term lyosol is intended to mean a Sol, the molecules or particles forming it are dissolved, suspended and/or dispersed in at least one solvent. Preferably, the lyosol used is a hydrosol. Hydrosol according to the present Application means that the solvent contains at least 50% by weight and preferably at least 80% by weight and particularly preferably at least 90% by weight and in particular at least 98% by weight of water.

In the present Application, the term gelation means that the lyosol exceeds the gelling point.

The lyogel network formed in step c) can be present in any desired organic and/or inorganic basic composition. Any systems known to a man skilled in the art from the state of the art are viable as a basic organic composition. Preferred is an inorganic basic composition based on oxidic silicon, tin, aluminium, gallium, indium, titanium and/or zirconium compounds and particularly preferably based on oxidic silicon, aluminium, titanium and/or zirconium compounds. Quite particularly preferred is a silicatic hydrogel which may contain fractions of zirconium, aluminium, titanium, vanadium and/or iron compounds, particularly a purely silicatic hydrogel.

Where the organic and/or inorganic basic compositions are concernred, the various components do not necessarily have to be homogeneously distributed and/or form a continuous network. It is also possible for individual components to be present wholly or partly in the form of inclusions, individual nuclei and/or deposits in the network.

Two preferred embodiments for the production of a lyosol are described hereinafter without however being restrictive of the invention.

In a first preferred embodiment, in step a), a silicatic lyosol is produced in that an aqueous water glass solution is transferred by means of an acid ion exchanger resin to a silica Sol having a pH value≦3.

Preferably, sodium and/or potassium water glass is used as the water glass. As an ion exchanger resin, preferably an acid resin is used, particularly those which contain sulphonic acid groups being suitable.

Prior to step b), the pH value of the lyosol can possibly be increased by means of a base in order to achieve a more rapid gel formation in step c). The pH value is thereby generally between 2 and 8, preferably between 4 and 6 and particularly preferably between 4and 5.

Generally, the bases used are $NH_4O_8$, NaOH, KOH, $Al(OH)_3$ and/or colloidal silicic acid.

The lyosol produced preferably from the above-described silicatic starting compounds may additionally contain zirconium, aluminium, tin and/or titanium compounds which are capable of producing condensation.

Furthermore, prior to and/or during Sol production, opacifiers can be added as additives, particularly infrared opacifiers to produce the contribution of radiation to the heat conductivity such as for example carbon black, titanium oxides, ion oxides and/or zirconium oxides.

In addition, fibres may be added to the Sol to enhance its mechanical stability. Inorganic fibres such as for example glass fibres or mineral fibres, organic fibres such as for example polyester fibres, aramide fibres, nylon fibres or fibres of vegetable origin as well as mixtures thereof, may be used as the fibre materials. The fibres can also be coated, e.g. polyester fibres metallised with a metal such as aluminium for example.

In a second preferred embodiment, in step a) a silicatic lyosol is provided which is produced in that a silica sol is obtained from an aqueous water glass solution with the aid of at least one organic and/or inorganic acid.

Therefore, generally a 6 to 25% by weight (in relation to the $SiO_2$ content) sodium and/or potassium water glass solution is the water glass solution used. Preferably, a 10 to 25% by weight water glass solution and in particular a 10 to 18% by weight water glass solution is used.

Furthermore, the water glass solution may also contain up to 90% by weight (in relation to $SiO_2$) of zirconium, aluminium, tin and/or titanium compounds capable of producing condensation.

As acids, generally 1 to 50% by weight and preferably 1 to 10% by weight acids are used. Preferred acids are sulphuric, phosphoric, fluoric, oxalic and hydrochloric acid. Hydrochloric acid is particularly preferred. It is also possible however to use mixtures of the appropriate acids.

Beside the actual mixing of the water glass solution and the acid, it is furthermore also possible already prior to the actual mixing to introduce a part of the acid into the water glass solution and/or a part of the water glass solution into the acid. In this way, it is possible to vary the ratio of the water glass solution/acid flows over a very wide range.

After the two solutions have been mixed, preferably a 5 to 12% by weight $SiO_2$ Sol is obtained. A 6 to 9% by weight $SiO_2$ Sol is particularly preferred. Furthermore, the pH value of the lyosol ought to be between 2 and 8, preferably between 4 and 5. If necessary, the pH value can also be increased by means of a base in order to achieve a more rapid gel formation in step c). The base used is generally $NH_4O_8$, NaOH, KOH, $Al(OH)_3$ and/or colloidal silicic acid.

In order to achieve the most thorough possible mixing of the water glass solution and the acid, both solutions, preferably independently of each other, ought to be at a temperature of between 0 and 30° C., particularly preferably between 5 and 25° C. and in particular between 10 and 20° C.

The rapid thorough mixing of the two solutions takes place in apparatus with which a man skilled in the art is familiar, such as for example mixing vats, mixing jets and static mixers. Semi-continuous or continuous methods such as for example mixing jets, are preferred.

Furthermore, it is possible to add to the water glass, the acid and/or the Sol opacifying agents as additives, particularly IR opacifiers to reduce the contribution made by radiation to heat conductivity such as for example carbon black, titanium oxides, ion oxides and/or zirconium oxides.

Furthermore, fibres may be added to the water glass, the acid and/or the Sol in order to increase mechanical stability. As fibre materials, inorganic fibres such as for example glass fibres or mineral fibres, organic fibres such as for example polyester fibres, aramide fibres, nylon fibres or fibres of vegetable origin as well as mixtures thereof may be used.

The fibres can also be coated, e.g. polyester fibres metallised with a metal such as for example aluminium.

In step b), the lyosol obtained n step a) is transferred to at least one water insoluble silylating agent. In this case, the silylating agent is present as a fluid.

Disiloxanes to formula (I) are used as silylating agents in steps b) and c),

$$R_3Si\text{—}O\text{—}SiR_3 \qquad (I)$$

in which the radical s R, independently of one another, are the same or different, each representing a hydrogen atom or a non-reactive, organic, linear, branched, cyclic, saturated or unsaturated aromatic or heteroaromatic radical, preferably $C_1$–$C_{18}$-alkyl or $C_6$–$C_{14}$-aryl and particularly preferably $C_1$–$C_6$-alkyl, cyclohexyl or phenyl and in particular methyl or ethyl.

Preferred is a symmetrical disiloxane, the term symmetrical disiloxane meaning a disiloxane in which both Si atoms have the same R radicals. Particularly preferably used are disiloxanes in which all the R radicals are the same. Particularly hexamethyl disiloxane is used.

Furthermore, any silylating agents known to the man skilled in the art may be used which are not miscible with water.

The temperature of the silylating agent in step b) can be between 0° C. and the boiling point of the liquid phase in the lyosol. Preferred temperatures are between 20° C. and 120° C., particularly preferably between 40° C. and 120° C. and quite particularly preferably between 40° C. and 100° C. It is also possible to work under pressure at higher temperatures.

The lyosol can thereby be incorporated into the silylating agent by any methods known to a man skilled in the art, such as for example by using mixing jets or dispensing means. The silylating agent forms thereby a phase in which the lyosol forms substantially spherical droplets by virtue of the interphase tension. The droplet size can thereby be adjusted for instance according to the manner of introduction, the mass flows and the distance from the surface of the liquid.

Surprisingly, it has been found that, once formed, droplets are mutually repellent so long as they are completely enclosed by the fluid medium. Consequently, a narrower distribution of droplet sizes is guaranteed.

In step c), the spherical lyosol formed in step b) becomes gelated in the silylating agent to produce the lyogel.

The temperature of the silylating agent in step c) can thereby be between 0° C. and the boiling point of the liquid phase in the lyosol. Preferred temperatures are between 20° C. and 120° C., particularly preferably between 40° C. and 120° C., very special preference being given to temperatures between 40° C. and 100° C. It is also possible to work at higher temperatures under pressure. The temperature can be used to influence the gelling rate. Generally, the lyosol becomes gelatinised more rapidly at a higher temperature.

The water-insoluble silylating agent can thereby be present in any kind of container, a column arrangement being however preferred. Where the column arrangement is concerned, the lyosol is preferably transferred from above (if the density of the silylating agent(s) is less than the density of the lyosol) or from below onto or into the silylating agent(s). In this respect, the above-described method known to a man skilled in the art may be used.

The dwell time of the lyosol droplets or lyogel particles can be adjusted by the height of the column filled with silylating agent. The gelating rate can also be adjusted by this means.

Furthermore, according to the nature and/or temperature of the silylating agent, so a different density and/or viscosity of the fluid medium will be present, so that the dwell time of the lyosol droplets or lyogel particles can likewise be adjusted. Furthermore, substantially the size of the lyosol droplets or lyogel particles is determined thereby.

The silylating agent can basically be present in stationary or moving form, and preferably however it is still.

Possibly an aqueous phase may be present under the silylating agent. If the lyosol droplets are gelated during the dwell time in the silylating agent, then the gel particles formed fall through the phase limit of the two fluids and the silylating agent is eliminated from the gel particles virtually without residue.

In order to achieve a greater stability of the gel particles, they can stay in the silylating agent or in an aqueous phase a little longer. This produces an ageing of the gel.

Furthermore, a longer dwell time in the silylating agent can produce silylation of the outer surface. As a result, the particles can be better suspended in an organic solvent for subsequent further treatment.

Furthermore, the gel particles obtained in this way can be further processed by known methods to produce aerogels. In this respect, lastingly hydrophobic aerogels which are modified by silylating agents are preferred.

A further advantage of the present invention is that upon further processing of the lyogels produced in order to obtain permanently hydrophobic aerogels by silylation and subsequent preferably sub-critical drying, no expensive washing stages have to be carried out.

The present invention is explained in greater detail hereinafter with reference to an example of embodiment, without being restricted thereby.

EXAMPLE

Production of gel particles in fluid HMDSO:

| column height: | 4 m |
| column diameter: | 25 cm |
| temperature: | 80 to 90° C. |

2 litres of a sodium water glass solution (SiO$_2$ content 6% by weight) and Na$_2$O:SiO$_2$ ratio of 1:3.3) are passed over a sheathed glass column (length 100 cm, diameter 8 cm) filled with an acid ion exchanger resin (styrene divinyl benzene copolymer with sulphonic acid groups, commercially available under the name ®Duolite C 20) (approx. 70 ml/min). The column is run at a temperature of about 7° C. The silicic acid solution running off at the bottom end of the column has a pH value of 2.3

The Sol from the ion exchanger is adjusted to a pH value of 4.6 to 4.9 by NaOH (0.5 to 1 molar) in a mixer. It is then cooled (7° C.) and by means of a pump it is passed through a hose (inside diameter 4 mm; distance from the surface of the HMDSO about 5 to 10 cm) and onto the heated HMDSO surface. The resulting hydrosol droplets fall slowly downwards in the HMDSO fluid and can be removed as hydrogel balls either directly from the hot HMDSO or, by means of a second water phase (below the HMDSO phase in the column) suspended in the water and removed from the column. The gel particles have a mean diameter of 2 mm.

The invention claimed is:

1. A method of producing substantially spherical lyogels comprising the steps of:
    a) providing a lyosol,
    b) transferring the lyosol provided in step a) to at least one silylating agent in which the lyosol is insoluble to form a substantially spherical lyosol, and
    c) gelling the substantially spherical lyosol formed in step b) in at least one silylating agent in which the substantially spherical lyosol is insoluble, to produce the substantially spherical lyogel, wherein the silylating agent in steps b) and c) comprises at least one disiloxane of formula (I)

$$R_3Si\text{—}O\text{—}SiR_3 \qquad (I)$$

the radicals R being, independently of each other, identical or different, each denoting a hydrogen atom or a non-reactive, organic, linear, branched, cyclic, saturated or unsaturated aromatic or heteroaromatic radical, and wherein the lyosol in step b) is transferred dropwise.

2. The method of claim 1, wherein the lyosol provided in step a) is a silicatic lyosol.

3. The method of claim 1, wherein the lyosol provided in step a) is prepared from an aqueous water glass solution, wherein the aqueous water glass solution is transformed by means of an acid ion exchanger resin to a silica sol with a pH value ≦3.

4. The method of claim 1, wherein the lyosol provided in step a) is a silicatic lyosol prepared from an aqueous water glass solution by means of at least one organic and/or inorganic acid.

5. The method of claim 1, wherein the lyosol provided in step a) is a hydrosol.

6. The method of claim 1, wherein only one silylating agent is used in step b).

7. The method of claim 1, wherein the at least one silylating agent in steps b) and c) is a fluid.

8. The method of claim 1, wherein the at least one silylating agent of steps b) and c) are the same.

9. The method of claim 1, wherein steps b) and c) occur simultaneously.

10. The method of claim 1, wherein the at least one silylating agent in step c) is disposed in a column.

11. The method of claim 1, wherein the disiloxane comprises a symmetrical disiloxane.

12. The method of claim 1, wherein all radicals R are the same.

13. The method of claim 1, wherein the disiloxane comprises hexamethyl disiloxane.

14. The method of claim 1, wherein the substantially spherical lyogel has a mean particle diameter of 2 mm.

15. The method of claim 1, further comprising the step of drying the substantially spherical lyogel.

16. The method of claim 15, wherein the substantially spherical lyogel is sub-critically dried.

17. A method of producing substantially spherical lyogels comprising the steps of:
    a) providing a lyosol,
    b) transferring the lyosol provided in step a) to at least one silylating agent in which the lyosol is insoluble to form a substantially spherical lyosol, and
    c) gelling the substantially spherical lyosol formed in step b) in at least one silylating agent in which the substantially spherical lyosol is insoluble, to produce the substantially spherical lyogel, wherein the silyating agent in steps b) and c) comprises at least one disiloxane of formula (I)

the radicals being, independently of each other, identical or different, each denoting a hydrogen atom or a non-reactive, organic, linear, branched, cyclic, saturated or unsaturated aromatic or heteroaromatic radical, and wherein the substantially spherical lyosol in step c) falls downwardly as droplets in the at least one silylating agent.

18. A method of producing substantially spherical lyogels comprising the steps of:
- a) providing a lyosol,
- b) transferring the lyosol provided in step a) to at least one silylating agent in which the lyosol is insoluble to form a substantially spherical lyosol, and
- c) gelling the substantially spherical lyosol formed in step b) in at least one silylating agent in which the substantially spherical lyosol is insoluble, to produce the substantially spherical lyogel, wherein the silylating agent in steps b) and c) comprises at least one disiloxane of formula (I)

the radicals R being, independently of each other, identical or different, each denoting a hydrogen atom or a non-reactive, organic, linear, branched, cyclic, saturated or unsaturated aromatic or heteroaromatic radical, and wherein the at least one silylating agent in step c) is stationary.

19. A method of producing substantially spherical lyogels comprising the steps of:
- a) providing a lyosol,
- b) transferring the lyosol provided in step a) to at least one silylating agent in which the lyosol is insoluble to form a substantially spherical lyosol, and
- c) gelling the substantially spherical lyosol formed in step b) in at least one silylating agent in which the substantially spherical lyosol is insoluble, to produce a substantially spherical silylated lyogel, wherein the lyosol provided in step a) is prepared from an aqueous water glass solution, wherein the aqueous water glass solution is transformed by means of an acid ion exchanger resin to a silica sol with a pH value $\leq 3$, and further comprising the step of drying the substantially spherical silylated lyogel to produce a hydrophobic aerogel.

* * * * *